U S009225849B2

(12) United States Patent
Jackson et al.

(10) Patent No.: US 9,225,849 B2
(45) Date of Patent: Dec. 29, 2015

(54) METHODS, SYSTEMS, AND COMPUTER READABLE MEDIA FOR STEERING A SUBSCRIBER BETWEEN ACCESS NETWORKS

(75) Inventors: Kenneth Charles Jackson, Overland Park, KS (US); Uri Baniel, Buffalo Grove, IL (US)

(73) Assignee: TEKELEC, INC., Morrisville, NC (US)

( * ) Notice: Subject to any disclaimer, the term of this patent is extended or adjusted under 35 U.S.C. 154(b) by 214 days.

(21) Appl. No.: 13/465,601

(22) Filed: May 7, 2012

(65) Prior Publication Data

US 2012/0281674 A1 Nov. 8, 2012

Related U.S. Application Data

(60) Provisional application No. 61/483,607, filed on May 6, 2011.

(51) Int. Cl.
| | |
|---|---|
| *H04W 4/00* | (2009.01) |
| *H04M 15/00* | (2006.01) |
| *H04L 12/14* | (2006.01) |
| *H04W 48/18* | (2009.01) |
| *H04W 88/18* | (2009.01) |
| *H04W 8/12* | (2009.01) |

(52) U.S. Cl.
CPC ........ *H04M 15/8044* (2013.01); *H04L 12/1403* (2013.01); *H04L 12/1407* (2013.01); *H04M 15/66* (2013.01); *H04W 48/18* (2013.01); *H04W 8/12* (2013.01); *H04W 88/182* (2013.01)

(58) Field of Classification Search
None
See application file for complete search history.

(56) References Cited

U.S. PATENT DOCUMENTS

| | | | | |
|---|---|---|---|---|
| 8,089,942 | B2 * | 1/2012 | Cai et al. | 370/338 |
| 8,326,263 | B2 * | 12/2012 | Zhou et al. | 455/408 |
| 8,577,329 | B2 | 11/2013 | Momtahan et al. | |

(Continued)

FOREIGN PATENT DOCUMENTS

| | | |
|---|---|---|
| EP | 1 988 680 A1 | 11/2008 |
| EP | 2 088 723 A1 | 8/2009 |

(Continued)

OTHER PUBLICATIONS

Notification of Transmittal of the International Search Report and the Written Opinion of the International Searching Authority, or the Declaration for International Patent Application No. PCT/US2012/036784 (Nov. 1, 2012).

(Continued)

*Primary Examiner* — Kwang B Yao
*Assistant Examiner* — Hardikkumar Patel
(74) *Attorney, Agent, or Firm* — Jenkins, Wilson, Taylor & Hunt, P.A.

(57) ABSTRACT

Methods, systems, and computer readable media for steering a subscriber between access networks are disclosed. According to one aspect, a method for steering a subscriber between access networks includes, at a first policy and charging rules function (PCRF) that serves a first access network, identifying a subscriber of the first access network as a candidate for steering to a second access network that is served by a second PCRF, querying the second PCRF to determine whether the candidate subscriber is allowed access to the second access network, and, upon a determination that the candidate subscriber is allowed access to the second access network, steering the candidate subscriber to the second access network.

33 Claims, 3 Drawing Sheets

(56) References Cited

U.S. PATENT DOCUMENTS

| | | | |
|---|---|---|---|
| 8,683,544 B2 | 3/2014 | Foottit et al. | |
| 8,787,174 B2 | 7/2014 | Riley et al. | |
| 8,818,327 B2 | 8/2014 | Shaikh | |
| 8,902,854 B2 | 12/2014 | McCann et al. | |
| 9,021,072 B2* | 4/2015 | Atreya .................. | H04W 12/08 370/230 |
| 2003/0003928 A1 | 1/2003 | Marjelund et al. | |
| 2003/0092444 A1 | 5/2003 | Sengodan et al. | |
| 2004/0116117 A1 | 6/2004 | Ahvonen et al. | |
| 2005/0107091 A1 | 5/2005 | Vannithamby et al. | |
| 2005/0195743 A1 | 9/2005 | Rochberger et al. | |
| 2007/0121501 A1 | 5/2007 | Bryson | |
| 2007/0191006 A1 | 8/2007 | Carpenter | |
| 2007/0195788 A1 | 8/2007 | Vasamsetti et al. | |
| 2007/0232301 A1* | 10/2007 | Kueh .................... | H04W 8/082 455/433 |
| 2008/0046963 A1* | 2/2008 | Grayson ............... | H04L 67/322 726/1 |
| 2008/0052258 A1* | 2/2008 | Wang et al. ....................... | 706/46 |
| 2009/0092107 A1 | 4/2009 | Cai et al. | |
| 2009/0109845 A1 | 4/2009 | Andreasen et al. | |
| 2010/0048161 A1 | 2/2010 | He et al. | |
| 2010/0113015 A1 | 5/2010 | Casati et al. | |
| 2010/0192170 A1 | 7/2010 | Raleigh | |
| 2010/0290392 A1 | 11/2010 | Rasanen et al. | |
| 2010/0291923 A1* | 11/2010 | Zhou ................... | H04L 12/1403 455/432.1 |
| 2010/0291924 A1 | 11/2010 | Antrim et al. | |
| 2010/0311392 A1 | 12/2010 | Stenfelt et al. | |
| 2011/0067085 A1 | 3/2011 | Brouard et al. | |
| 2011/0076985 A1 | 3/2011 | Chami et al. | |
| 2011/0096688 A1 | 4/2011 | Sachs et al. | |
| 2011/0158090 A1 | 6/2011 | Riley et al. | |
| 2011/0173332 A1* | 7/2011 | Li ........................... | H04L 12/14 709/227 |
| 2011/0199903 A1 | 8/2011 | Cuervo | |
| 2011/0225306 A1 | 9/2011 | Delsesto et al. | |
| 2011/0230188 A1 | 9/2011 | Gemski | |
| 2011/0252123 A1* | 10/2011 | Sridhar .................. | H04L 12/14 709/223 |
| 2012/0014332 A1 | 1/2012 | Smith et al. | |
| 2012/0140632 A1 | 6/2012 | Norp et al. | |
| 2012/0144226 A1 | 6/2012 | Yang et al. | |
| 2012/0188949 A1* | 7/2012 | Salkintzis ............. | H04L 45/308 370/329 |
| 2012/0236824 A1 | 9/2012 | McCann et al. | |
| 2014/0003297 A1 | 1/2014 | Uusitalo et al. | |
| 2014/0031029 A1 | 1/2014 | Rajagopalan et al. | |
| 2014/0100962 A1 | 4/2014 | Rajagopalan et al. | |

FOREIGN PATENT DOCUMENTS

| | | |
|---|---|---|
| EP | 2 093 931 A1 | 8/2009 |
| JP | 2010-226470 | 10/2010 |
| JP | 2010-263604 A | 11/2010 |
| JP | 2011-029689 A | 2/2011 |
| KR | 10-0497290 B1 | 6/2005 |
| WO | WO 2008/027660 A2 | 3/2008 |
| WO | WO 2008/132100 A1 | 11/2008 |
| WO | WO 2008/147933 A2 | 12/2008 |
| WO | WO 2009/058067 A1 | 5/2009 |
| WO | WO 2009/099256 A1 | 8/2009 |
| WO | WO 2009/127276 A1 | 10/2009 |
| WO | WO 2009/145785 A1 | 12/2009 |
| WO | WO 2009/149341 A2 | 12/2009 |
| WO | WO 2010/052030 A1 | 5/2010 |
| WO | WO 2010/055402 A1 | 5/2010 |
| WO | WO 2010/079715 A1 | 7/2010 |
| WO | WO 2010/080966 A1 | 7/2010 |
| WO | WO 2010/139058 A1 | 12/2010 |
| WO | WO 2010/139360 A1 | 12/2010 |
| WO | WO 2011/082035 A2 | 7/2011 |
| WO | WO 2012/129167 A1 | 9/2012 |
| WO | WO 2014/015331 A1 | 1/2014 |

OTHER PUBLICATIONS

Communication of European Publication Number And Information on the Application of Article 67(3) EPC for European Patent Application No. 10841576.1 (Oct. 10, 2012).

Notification of Transmittal of The International Search Report and the Written Opinion of the International Searching Authority, or the Declaration for International Patent Application No. PCT/US2012/029663 (Aug. 29, 2012).

PCT International Patent Application No. PCT/US2012/036784, Titled, "Methods, Systems, and Computer Readable Media for Steering a Subscriber Between Access Networks," (Unpublished, Filed May 7, 2012).

3rd Generation Partnership Project, "Technical Specification Group Services and System Aspects; Policy and charging control architecture (Release 11)," 3GPP TS 23.203, v11.5.0 (Mar. 2012).

Notification of Transmittal of the International Search Report and the Written Opinion of the International Searching Authority, or the Declaration for International Patent Application No. PCT/US2010/061586 (Sep. 26, 2011).

"Smart Cards; Card Application Toolkit (CAT) (Release 9)," ETSI TS 102 223 V9.2.0, pp. 1-209 (Oct. 2010).

3GPP, "3rd Generation Partnership Project; Technical Specification Group GSM/EDGE Radio Access Network; Mobile Radio Interface Layer 3 Specification; Radio Resources Control (RRC) Protocol (Release 10)," 3GPP TS 44.018 V10.0.0. pp. 1-429 (Sep. 2010).

3GPP, "3rd Generation Partnership Project; Technical Specification Group Radio Access Network; Evolved Universal Terrestrial Radio Access (E-UTRA); Radio Resouce Control (RRC); Protocol Specification (Release 9)," 3GPP TS 36.331 V9.4.0, pp. 1-252 (Sep. 2010).

3GPP, "3rd Generation Partnership Project; Technical Specification Group Radio Access Network; Radio Resource Control (RRC); Protocol Specification (Release 9)," 3GPP TS 25.331, V9.4.0, pp. 1-1789 (Sep. 2010).

3GPP, "3rd Generation Partnership Project; Technical Specification Group Core Network and Terminals; UICC-terminal Interface; Physical and Logical Characteristics (Release 9)," 3GPF, TS 31.101, V9.1.0, pp. 1-35 (Jun. 2010).

Rao "Mobile Broadband Evolution—LTE and EPC," Motorola General Business, LTE EPC IEEE ComSoC Boston (Apr. 8, 2010).

3GPP, "3rd Generation Partnership Project; Technical Specification Group Services and System Aspects; Network Identity and Timezone (NITZ); Service Description, Stage 1 (Release 9)," 3GPP TS 22.042, V9.0.0, pp. 1-8 (Dec. 2009).

Third Generation Partnership Project, "Technical Specification Group Services and System Aspects; General Packet Radio Service (GPRS) enhancements for Evolved Universal Terrestrial Radio Access Network (E-UTRAN) access (Release 8)," 3GPP TS 23.401, V8.4.1 (Dec. 2008).

Communication of extended European Search Report for European Patent Application No. 10841576.1 (May 9, 2014).

Applicant-Initiated Interview Summary for U.S. Appl. No. 13/423,991 (Mar. 26, 2014).

Notice of Allowance and Fee(s) Due for U.S. Appl. No. 12/973,228 (Mar. 20, 2014).

Communication of European Publication No. and Information on the Application of Article 67(3) EPC for European Patent Application No. 12781800.3 (Feb. 12, 2014).

Communication of European Publication No. and Information on the Application of Article 67(3) EPC for European Patent Application No. 12760558.2 (Jan. 7, 2014).

Non-Final Office Action for U.S. Appl. No. 13/423,991 (Nov. 19, 2013).

Notification of Transmittal of the International Search Report and the Written Opinion of the International Searching Authority, or the Declaration for International Application No. PCT/US2013/051447 (Oct. 28, 2013).

Non-Final Office Action for U.S. Appl. No. 12/973,228 (Oct. 25, 2013).

Final Office Action for U.S. Appl. No. 12/973,228 (Jun. 21, 2013).

"3rd Generation Partnership Project; Technical Specification Group Core Network and Terminals; Access to the 3GPP Evolved Packet

(56) References Cited

OTHER PUBLICATIONS

Core (EPC) via non-3GPP access networks; Stage 3 (Release 12)," 3GPP TS 24.302, V12.1.0, pp. 1-68 (Jun. 2013).
Non-Final Office Action for U.S. Appl. No. 12/973,228 (Feb. 1, 2013).
Non-Final Office Action for U.S. Appl. No. 14/051,119 (Dec. 5, 2014).
Extended European Search Report for European Patent Application No. 12781800.3 (Mar. 23, 2015).
Non-Final Office Action for U.S. Appl. No. 13/947,314 (Jan. 16, 2015).
Extended European Search Report for European Patent Application No. 12760558.2 (Dec. 23, 2014).
Letter Regarding Notice of Grant for Japanese Patent Application No. 2013-558237 (Nov. 25, 2014).
Letter Regarding First Office Action for Japanese Patent Application No. 2014-509509 (Oct. 7, 2014).
First Office Action for Chinese Patent Application No. 201080064945.X (Sep. 17, 2014).
Notice of Allowance and Fee(s) Due for U.S. Appl. No. 13/423,991 (Aug. 15, 2014).
Office Action for Japanese Patent Application No. 2013-558237 (Jul. 29, 2014).
China Mobile et al., "Policy Control Based on Network Status," 3GPP TSG SA WG2 Meeting #81, pp. 1-2, (Oct. 2010).
3rd Generation Partnership Project, "Technical Specification Group Services and System Aspects; Study on Support of BBF Access Interworking (Release 11)," 3GPP TS 23.839, V0.06.0, pp. 1-27 (Apr. 2011).
3rd Generation Partnership Project, "Technical Specification Group Services and System Aspects; Policy and charging control architecture (Release 11)," 3GPP TS 23.203, v11.1.0 pp. 1-136 (Mar. 2011).
Huawei, Hisilicon, "QoS Negotiation between BBF and 3GPP," 3GPP TSG SA WG2 Meeting #82, pp. 1-7. (Nov. 15-19, 2010).
Final Office Action for U.S. Appl. No. 14/051,119 (Apr. 24, 2015).
Final Office Action and Applicant-Initiated Interview Summary for U.S. Appl. No. 13/947,314 (Jul. 16, 2015).
Communication under Rule 71(3) EPC for European Patent Application No. 10841576.1 (May 7, 2015).
Communication of European Publication No. and Information on the Application of Article 67(3) EPC for European Patent Application No. 13819435.2 (Apr. 30, 2015).
Second Office Action for Chinese Patent Application No. 201080064945.X (Apr. 22, 2015).
Letter Regarding Notice of Grant for Japanese Patent Application No. 2014-509509 (Jun. 2, 2015).
Advisory Action for U.S. Appl. No. 14/051,119 (Jul. 30, 2015).

\* cited by examiner

METHODS, SYSTEMS, AND COMPUTER READABLE MEDIA FOR STEERING A SUBSCRIBER BETWEEN ACCESS NETWORKS

PRIORITY CLAIM

This application claims the benefit of U.S. Provisional Patent Application Ser. No. 61/483,607, filed May 6, 2011; the disclosure of which is incorporated herein by reference in its entirety.

TECHNICAL FIELD

The subject matter described herein relates to policy and charging rules functions (PCRFs). More particularly, the subject matter described herein relates to methods, systems, and computer readable media for steering a subscriber between access networks.

BACKGROUND

A policy and charging rules function (PCRF) may want to refer a user to a different access network that is controlled or policed by a different PCRF. For example, a PCRF within an LTE access network may want to offload a user to a Wi-Fi network. Before the referrer PCRF can do that, however, it needs to verify with the target PCRF that the user is authorized to use the target access network. There is no known mechanism to allow this kind of verification to take place. Accordingly, there exists a need for steering a subscriber between access networks.

SUMMARY

According to one aspect, a method for steering a subscriber between access networks includes, at a first policy and charging rules function (PCRF) that serves a first access network, identifying a subscriber of the first access network as a candidate for steering to a second access network that is served by a second PCRF, querying the second PCRF to determine whether the candidate subscriber is allowed access to the second access network, and, upon a determination that the candidate subscriber is allowed access to the second access network, steering the candidate subscriber to the second access network.

According to another aspect, the subject matter described herein includes a system for steering a subscriber between access networks, the system including a first policy and charging rules function (PCRF) for serving a first access network. The first PCRF is configured to identify a subscriber of the first access network as a candidate for steering to a second access network that is served by a second PCRF, query the second PCRF to determine whether the candidate subscriber is allowed access to the second access network, and, upon a determination that the candidate subscriber is allowed access to the second access network, steer the candidate subscriber to the second access network.

The subject matter described herein can be implemented in software in combination with hardware and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which.

DETAILED DESCRIPTION

In accordance with the subject matter disclosed herein, methods, systems, and computer readable media for steering a subscriber between access networks are provided. In an example application, inter-PCRF communication is utilized for the purpose of offloading a candidate subscriber from an LTE network to a Wi-Fi network, an action herein referred to as "Wi-Fi offloading". The subject matter described herein is not limited to just this application, however, but may be applied to steer a subscriber in any direction (e.g., Wi-Fi to LTE) and between other types of access networks.

Reference will now be made in detail to exemplary embodiments of the present invention, examples of which are illustrated in the accompanying drawings. Wherever possible, the same reference numbers will be used throughout the drawings to refer to the same or like parts.

Figure 1:
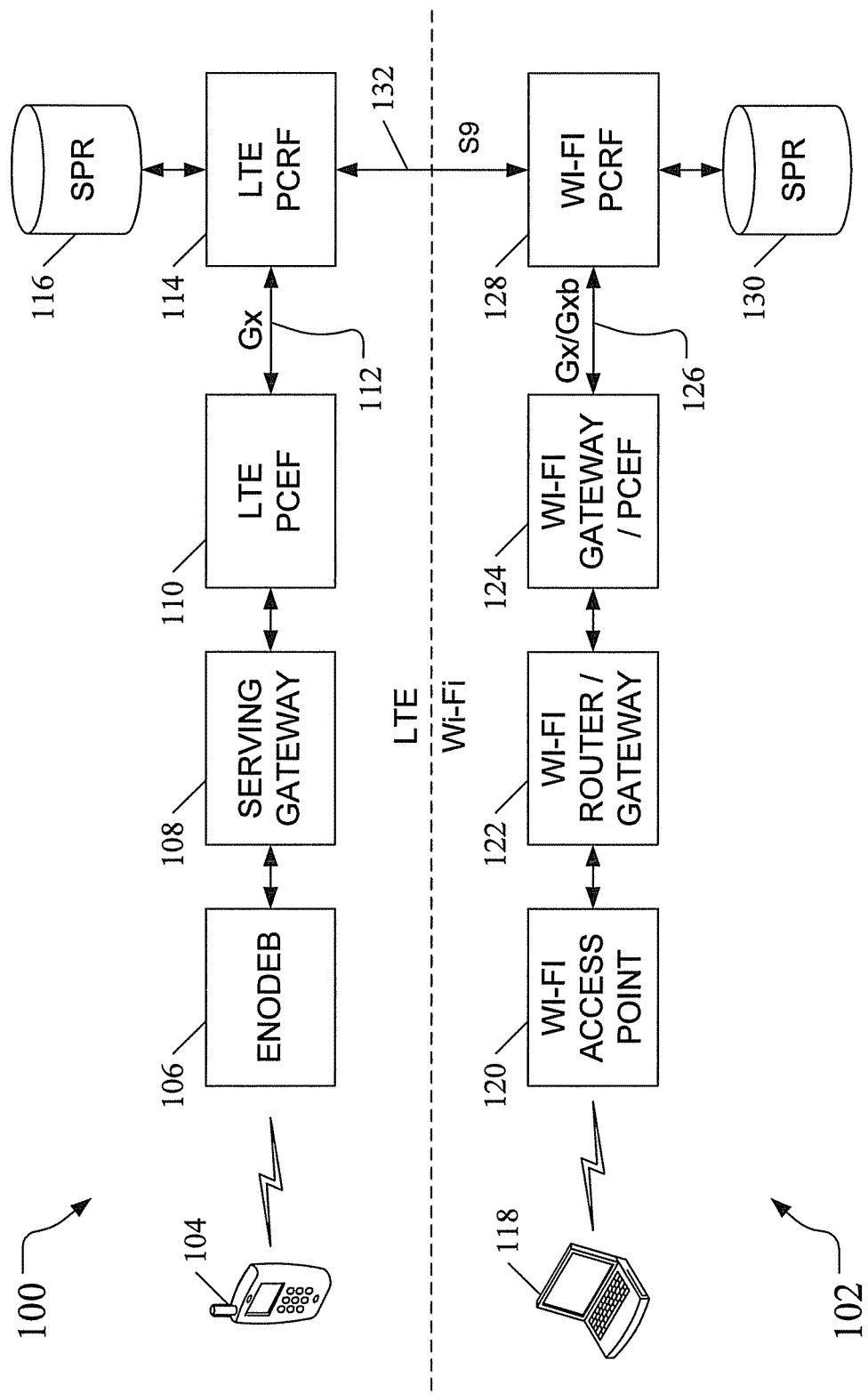
FIG. 1 is a block diagram illustrating an exemplary system for steering a subscriber between access networks according to an embodiment of the subject matter described herein.

FIG. 1 is a block diagram illustrating an exemplary system for steering a subscriber between access networks according to an embodiment of the subject matter described herein. In one embodiment, the system includes a first network 100 and a second network 102. In the embodiment illustrated in FIG. 1, first network 100 is an LTE network and second network 102 is a Wi-Fi network, but in alternative embodiments, other network types may be used.

In the embodiment illustrated in FIG. 1, a mobile device or other user equipment (UE) 104 within LTE network 100 is communicating over a radio or wireless interface with an enhanced node B (eNode B) 106, which communicates through a serving gateway 108 to an LTE policy and charging enforcement function (LTE PCEF) 110. LTE PCEF 110 communicates via a first Gx interface 112 with an LTE policy and charging rules function (PCRF) 114. In one embodiment, LTE PCRF 114 may communicate with a subscriber profile repository (SPR) 116, which stores information about home and visiting subscribers to LTE network 100. Multiple eNodeBs may be supported or served by a single serving gateway, multiple serving gateways may be supported or served by a single PCEF, and multiple PCEFs may be supported or served by a single PCRF. Other network topologies are also within the scope and meaning of the subject matter described herein.

In the embodiment illustrated in FIG. 1, a Wi-Fi-capable device 118 within Wi-Fi network 102 is communicating with a Wi-Fi access point 120, which communicates through a Wi-Fi router/gateway 122 to a Wi-Fi gateway/PCEF 124. Wi-Fi gateway/PCEF 124 communicates via Gx/Gxb interface 126 with a Wi-Fi PCRF 128. In one embodiment, Wi-Fi PCRF 128 may communicate with its own SPR 130. Multiple Wi-Fi access points may be supported or served by a single Wi-Fi router, multiple Wi-Fi routers may be supported or served by a single Wi-Fi gateway, and multiple Wi-Fi gateways may be supported or served by a single Wi-Fi PCRF. Other network topologies are also within the scope and meaning of the subject matter described herein.

An S9 interface 132 is used for providing transfer of quality of service (QoS) policy and charging control information between a home PCRF and a visited PCRF according to the Third Generation Partnership Project (3GPP) technical specification (TS) 23.401. In the embodiment illustrated in FIG. 1, S9 interface 132 is used to transfer QoS policy and charging control information between LTE PCRF 114 and Wi-Fi PCRF 128. In contrast to a conventional PCRF, however, a PCRF according to an embodiment of the subject matter describe herein is configured to use the S9 interface in a non-standard way to query another PCRF.

In the embodiment illustrated in FIG. 1, for example, LTE PCRF 114 may lead Wi-Fi PCRF 128 to believe that user device 104 is attempting to gain access to Wi-Fi network 102, i.e., as if user device 104 had attempted to connect to Wi-Fi access point 120, even though user device 104 has not actually attempted to make this connection. This is referred to herein as "faking a user attachment to the second network." By representing to the second PCRF that the candidate subscriber is requesting access to the second network, LTE PCRF 114 leads Wi-Fi PCRF 128 to provide information to LTE PCRF 114 that will tell LTE PCRF 114 whether or not user device 104 would be allowed onto Wi-Fi network 102. LTE PCRF 114 then uses this information to steer (or not steer) user device 104 onto Wi-Fi network 102. From the point of view of Wi-Fi PCRF 128, LTE PCRF 114 may appear to be one of the gateways, such as Wi-Fi gateway/PCEF 124, that normally make such requests to Wi-Fi PCRF 128. In this manner, LTE PCRF 114 uses S9 interface 132 not for its normal purpose of transferring QOS policy and charging control information between itself and Wi-Fi PCRF 128, but instead for a purpose for which Gx/Gxb interface 126 is normally used.

Figure 2:
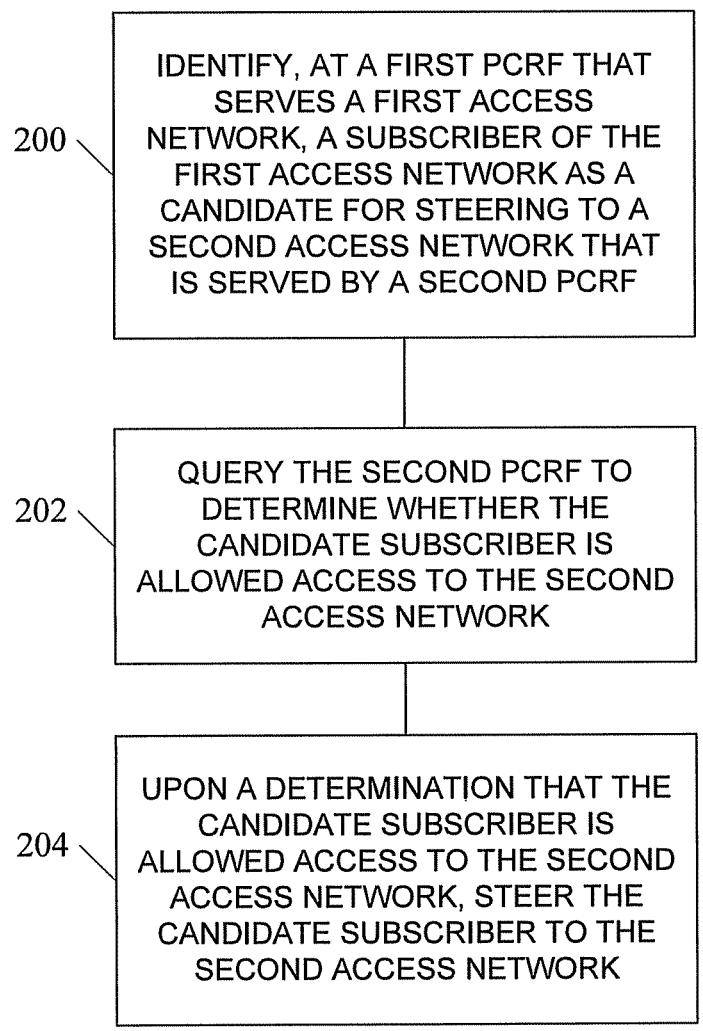
FIG. 2 is a flow chart illustrating an exemplary process for steering a subscriber between access networks according to an embodiment of the subject matter described herein.

FIG. 2 is a flow chart illustrating an exemplary process for steering a subscriber between access networks according to an embodiment of the subject matter described herein. In the embodiment illustrated in FIG. 2, the process starts at block 200, in which a first PCRF that serves a first access network identifies a subscriber of the first access network as a candidate for steering to a second access network that is served by a second PCRF. As illustrated in FIG. 1, the first and second access networks may be different types of access networks, such as LTE and Wi-Fi, for example.

A candidate subscriber may be identified in any number of ways, including, but not limited to identifying a subscriber that is accessing or attempting to access the first access network. That is, the candidate subscriber is not necessarily a subscriber that is already using or has already gained access to the first access network, but may be a subscriber that is only requesting access but has not been given access yet. Alternatively, a subscriber that is using or attempting to use a particular network application or service may be identified as a candidate subscriber. For example, a subscriber that wants to use a relatively high bandwidth service, such as streaming video, web browsing, music or multimedia content delivery, or IMS services, or even particular low-to-moderate bandwidth services, such as voice, may be identified as candidates for steering to a faster, lower-cost, or lower-congestion access network. In one embodiment, candidates having a particular service plan or subscriber profile may be identified as candidates for steering. For example, a subscriber may be identified as a candidate for steering based on services requested and authorizations or permissions or lack thereof. A subscriber's current activity or historical activity may also identify them as a candidate for steering to another access network.

Steering may be prompted by detection of other types of triggers, as well. For example, subscribers may be steered to a second or alternate access network based on network conditions of either the first or second networks, such as actual or predicted network congestion, as well as based on general network health, such as detected equipment failure or other network impairment, scheduled network maintenance, and so on.

At block 202, the first PCRF queries the second PCRF to determine whether the candidate subscriber is allowed access to the second access network. In one embodiment, the first PCRF may send the query to the second PCRF via an S9 interface that connects the first and second PCRFs. In one embodiment, the first PCRF may send a credit control request (CCR) message to the second PCRF, and may receive a credit control answer (CCA) message from the second PCRF. In one embodiment, by sending the CCR message to the second PCRF, the first PCRF is representing to the second PCRF that the candidate subscriber is requesting access to the second access network, even if the subscriber is not actually attempting to do this. In one embodiment, from the viewpoint of the second PCRF, the first PCRF is presenting itself as a gateway of the second PCRF, even though the second PCRF is not actually a gateway.

In one embodiment, in order to determine whether or not the candidate subscriber will be allowed access to the second access network, the first PCRF may need to determine how the candidate subscriber should be identified to the second access network. This may be accomplished in a number of ways. For example, this second subscriber identifier may be retrieved by a database lookup, conversion, translation, or other mechanism that maps the subscriber identifier used by the first access network, herein referred to as the "first subscriber identifier", to the subscriber identifier used by the second access network, herein referred to as the "second subscriber identifier." In one embodiment, the first PCRF may query an SPR, HSS, or other database to retrieve an identifier by which the candidate subscriber is known to the second access network and/or to the second PCRF. In an alternative embodiment, if both the first and second PCRFs use the same subscriber identifier, this additional conversion or mapping would not be necessary.

In one embodiment, the queried database may have the ability to store different user IDs or other subscriber identifiers for a number of different access networks. In this embodiment, a PCRF may have the ability to ask for the subscriber identifier to be used with the particular access network to which the PCRF wants to steer the candidate subscriber. Alternatively, the PCRF may query the database and select the target access network based on the subscriber identifiers that are available or not available for the candidate subscriber.

Thus, the referrer PCRF may download the candidate subscriber's profile from a database, such as a subscriber profile repository (SPR), a home subscriber server (HSS), or other database which has data for the referrer access network, and retrieve the user-ID used by the target access network.

In one embodiment, the method involves faking a user attachment to justify or allow a query-response between the PCRFs. During the query, the referrer PCRF may use the original user-ID, e.g., the identifier known to the referrer PCRF, or it may use the user-ID or other identifier known to the target PCRF.

At block 204, upon a determination that the candidate subscriber is allowed access to the second access network, the first PCRF steers the candidate subscriber to the second access network. The candidate subscriber may be steered to the second access network in any number of ways, including but not limited to: generating a first policy rule that results in the throttling of use of the first access network by the candidate subscriber and sending that policy rule to the appropriate PCEF or like node; notifying the candidate subscriber of the availability of the second access network; sending a message, such as a text message, voice message, email, etc., to the candidate subscriber suggesting that he or she use the second access network instead; and so on. A candidate subscriber may be steered from one access network to another access network by using techniques that range from encouragement to coercion.

A detailed example of the operation of one embodiment of the subject matter described herein, that of LTE PCRF 114, will now be described using FIG. 3.

Figure 3:
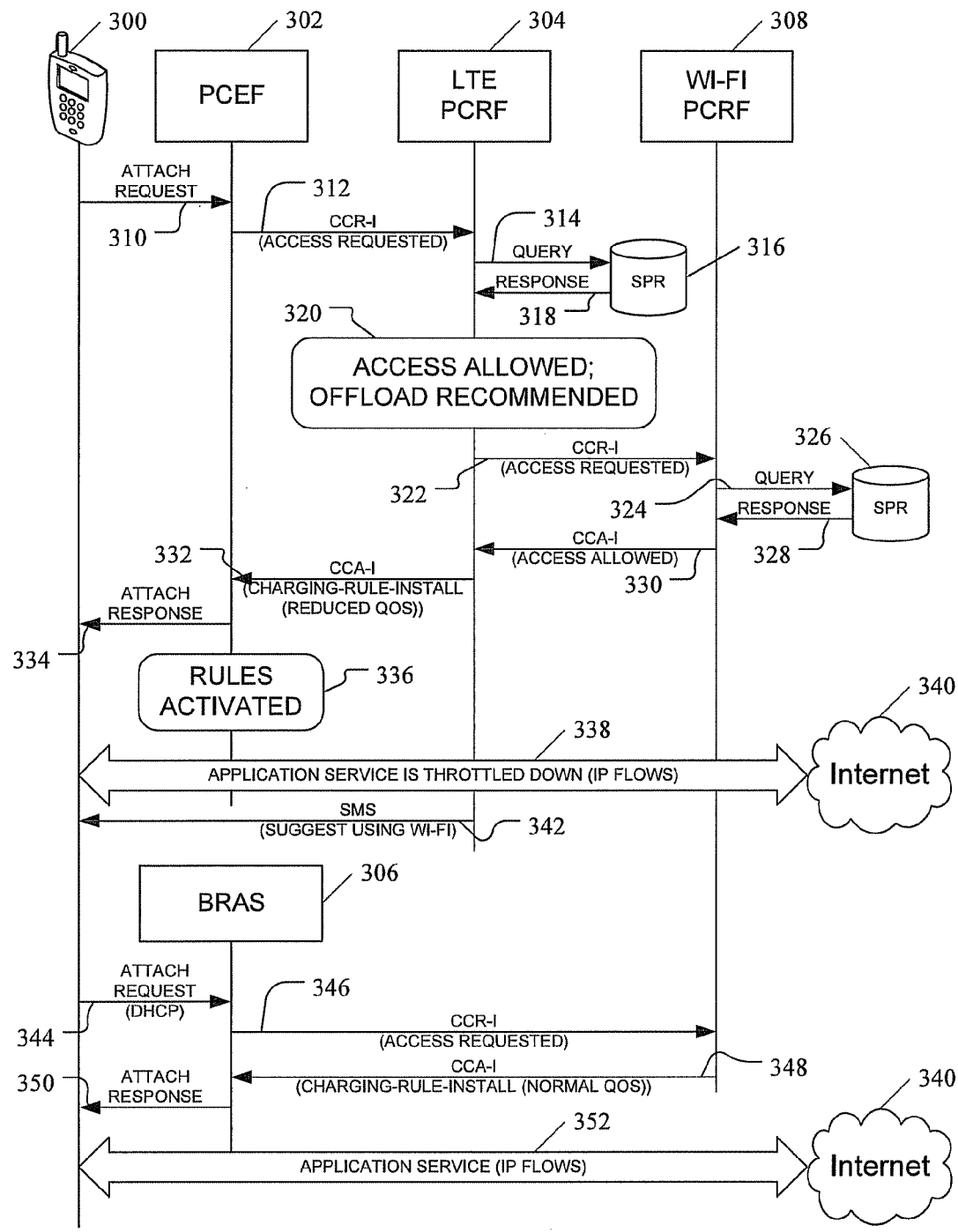
FIG. 3 is a signaling message flow diagram illustrating exemplary messages for steering a subscriber between access networks being communicated between nodes in a telecommunications network according to an embodiment of the subject matter described herein.

FIG. 3 is a signaling message flow diagram illustrating exemplary messages for steering a subscriber between access networks being communicated between nodes in a telecommunications network according to an embodiment of the subject matter described herein. In one embodiment, these messages may be exchanged between PCRFs for the purpose of Wi-Fi offloading. In the embodiment illustrated in FIG. 3, user equipment UE 300 is operating within an LTE network that includes a policy and charging enforcement function PCEF 302, which is controlled by a policy and charging rules function that serves the LTE network, LTE PCRF 304. UE 300 is also operating within a Wi-Fi network that includes a broadband remote access server BRAS 306 which communicates with a Wi-Fi PCRF 308 that serves the Wi-Fi network.

In the embodiment illustrated in FIG. 3, UE 300 sends an attach request 310 to PCEF 302. In response to receiving the attach request, PCEF 302 sends a Diameter credit control request initial (CCR-I) message 312 to LTE PCRF 304, which sends a query 314 to a subscriber profile repository (SPR) 316. SPR 316 sends a response 318 to LTE PCRF 304 that indicates whether UE 300 is allowed access to the LTE network and that includes information about services and features that UE 300 may use. Based on this information, LTE PCRF 304 determines what actions to be taken. In the embodiment illustrated in FIG. 3, for example, LTE PCRF 304 may allow UE 300 access to the network but recommend that UE 300 be steered off of the LTE network and onto an available Wi-Fi network (block 320).

LTE PCRF 304 may then attempt to determine whether UE 300 will be allowed to access the Wi-Fi network by issuing a second CCR-I message 322 to Wi-Fi PCRF 308. Wi-Fi PCRF 308 may then send a query 324 to its own SPR 326 and receive from SPR 326 a response message 328. In the embodiment illustrated in FIG. 3, Wi-Fi PCRF 308 responds to CCR-I 322 with a credit control answer initial (CCA-I) message 330 indicating that UE 300 is allowed access to the Wi-Fi network.

Now that LTE PCRF 304 has confirmed that UE 300 will be allowed access to the Wi-Fi network, LTE PCRF 304 can begin offloading or steering UE 300 off of the LTE network and onto the Wi-Fi network. FIG. 3 illustrates two actions that LTE PCRF 304 may take to steer UE 300 onto a Wi-Fi network.

First, as part of the response to the original CCR message 312, LTE PCRF 304 may issue a CCA-I message 332 that allows UE 300 to access the LTE network but at a reduced level of quality of service, or QoS. In this manner LTE PCRF 304 may instruct PCEF 302 to install a charging rule that limits or curtails the QoS made available to UE 300. In response, PCEF 302 may issue an attach response 334 to UE 300, which allows UE 300 to access the LTE network. PCEF 302 then activates the installed charging rules (block 336) which provides application service 338 between UE 300 and the Internet 340, but at a lower bandwidth, lower priority, higher latency, or other manifestation of a low QoS.

The second action that LTE PCRF 304 may take to steer UE 300 onto a Wi-Fi network is to send a short message service (SMS) message (i.e., a "text" message) or a multimedia message service (MMS) message 342 to UE 300, to inform the user of UE 300 of the availability of the Wi-Fi network and suggest that the user use the Wi-Fi network instead.

Alternatively, UE 300 may be commanded or forced to offload to the Wi-Fi network, e.g., by denying access to the LTE network or providing access for a limited time or with severely limited bandwidth before terminating access.

As UE 300 is steered to the Wi-Fi network, UE 300 issues another attach request 344, but this time to BRAS 306 within the Wi-Fi network. In one embodiment, the attach request comes in the form of a dynamic host control protocol (DHCP) request from UE 300 to BRAS 306. In the embodiment illustrated in FIG. 3, in response to receiving DHCP request 344 from UE 300, BRAS 306 may issue its own CCR-I request 346 to Wi-Fi PCRF 308. For simplicity, it is assumed that Wi-Fi PCRF 308 still maintains the results from response 328 and thus does not need to query SPR 326 a second time, but in other embodiments Wi-Fi PCRF 308 may query SPR 326 again. In the embodiment illustrated in FIG. 3, Wi-Fi PCRF 308 responds with a CCA-I message 348, which includes an instruction to install a charging rule to provide normal QoS to UE 300. BRAS 306 sends an attach response 350 to UE 300 and allows normal application service 352 between UE 300 and the network 340.

In one embodiment, only users that are authorized to use the first access network are considered for steering to a second access network. In an alternative embodiment, however, a subscriber may be authorized for some but not all services in the first access network. In this scenario, steering the subscriber to the second access network may be triggered when the subscriber attempts to use a service that the subscriber is not authorized for in the first access network but may be able to receive in the second access network. For example, an LTE subscriber attempting to download streaming media may be steered to a nearby Wi-Fi network for that purpose. Steering may be appropriate when the desired service is not available from the first access network either because of congestion or lack of authorization, etc.

The following is an example of steps performed in a use case. An IP CAN session establishment request is sent from a user and received by an LTE PCEF. In response, the LTE PCEF sends a CCR-I to the Wi-Fi PCRF. The Wi-Fi PCRF looks up the user profile in the SPR and determines that the user is entitled to LTE service. However, due to offload logic, the LTE PCRF decides to query the WI-FI PCRF about that user. The LTE PCRF sends a query to the WI-FI PCRF, thus faking a user attachment using the Wi-Fi id of the user as retrieved from the LTE SPR. The LTE PCRF installs rules to throttle down the user (in order to encourage the user to switch over to WIFI). The LTE PCRF sends an SMS message to the user suggesting that the user switch to WIFI access. In response to the message, the user attaches to Wi-Fi (DHCP etc.) The Wi-Fi router goes to the BRAS, which authorizes the user with the Wi-Fi PCRF. The user is assigned a normal bandwidth.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for steering a subscriber between access networks, the method comprising:
   at a first policy and charging rules function (PCRF) that serves a first access network:
   identifying a subscriber of the first access network as a candidate subscriber for steering to a second access network that is served by a second PCRF;
   faking a user attachment to the second access network by querying the second PCRF to determine whether the candidate subscriber is allowed access to the second access network, wherein the first PCRF represents to the second PCRF that the candidate subscriber is requesting access to the second access network, and wherein querying the second PCRF comprises sending a credit control request (CCR) message to the second PCRF via an S9 interface that connects the first PCRF and the second PCRF;
   receiving a credit control answer (CCA) message from the second PCRF via the S9 interface as confirmation that the candidate subscriber is allowed access to the second access network;
   steering the candidate subscriber to the second access network; and
   offloading the candidate subscriber from the first access network to the second access network;
   wherein the first access network is of a different type than the second access network; and
   wherein the first access network comprises a long term evolution (LTE) network and the second access network comprises a Wi-Fi access network.

2. The method of claim 1 wherein offloading the candidate subscriber comprises denying access to the first access network.

3. The method of claim 1 further comprising sending a short message service (SMS) message or a multimedia message service (MMS) message to the candidate subscriber prior to offloading the candidate subscriber.

4. The method of claim 1 wherein offloading the candidate subscriber comprises limiting a Quality of Service (QoS) or a bandwidth associated with a service provided by the first access network prior to terminating access to the first access network.

5. The method of claim 1 wherein the first PCRF presents itself to the second PCRF as a gateway of the second PCRF.

6. The method of claim 1 wherein representing to the second PCRF that the candidate subscriber is requesting access to the second access network comprises identifying the candidate subscriber using a subscriber identifier that is known to the second PCRF.

7. The method of claim 6 wherein identifying the candidate subscriber using a subscriber identifier that is known to the second PCRF comprises mapping a first subscriber identifier that is known to the first PCRF to a second subscriber identifier that is known to the second PCRF and identifying the subscriber to the second PCRF using the second subscriber identifier.

8. The method of claim 7 wherein mapping a first subscriber identifier that is known to the first PCRF to a second identifier that is known to the second PCRF comprises querying a database that maps the first subscriber identifier to the second subscriber identifier.

9. The method of claim 8 wherein querying a database that maps the first subscriber identifier to the second subscriber identifier comprises querying a subscriber profile repository (SPR) or home subscriber server (HSS).

10. The method of claim 1 wherein steering the candidate subscriber to the second access network comprises at least one of:
    generating by the first PCRF a policy rule that results in a throttling of use of the first access network by the candidate subscriber;
    notifying the candidate subscriber of an availability of the second access network; and
    sending a message to the candidate subscriber suggesting that the candidate subscriber use the second access network.

11. The method of claim 1 wherein identifying a subscriber of the first access network as a candidate subscriber for steering comprises identifying a subscriber that is accessing or attempting to access the first access network.

12. The method of claim 1 wherein identifying a subscriber of the first access network as a candidate subscriber for steering comprises identifying a subscriber that is using or attempting to use a network application or service.

13. The method of claim 12 wherein the network application or service comprises at least one of: a streaming video service; a web browsing service; a voice service; a messaging service; a music delivery service; a multimedia content delivery service; and an IMS service.

14. The method of claim 1 wherein identifying a subscriber of the first access network as a candidate subscriber for steering comprises identifying a subscriber based on the subscriber's profile, authorizations, permissions, current activity or historical activity.

15. The method of claim 1 wherein identifying a subscriber of the first access network as a candidate subscriber for steering comprises detecting a trigger for steering candidate subscribers to the second access network.

16. The method of claim 15 wherein detecting a trigger for steering candidate subscribers to the second access network comprises detecting a network condition, wherein the network condition comprises at least one of: actual network congestion, predicted network congestion, detected network impairment, and scheduled network maintenance.

17. A system for steering a subscriber between access networks, the system comprising:
    a first policy and charging rules function (PCRF) for serving a first access network, the first PCRF that when executed by a processor, is configured to:
    identify a subscriber of the first access network as a candidate subscriber for steering to a second access network that is served by a second PCRF;
    fake a user attachment to the second access network by sending a query to the second PCRF to determine whether the candidate subscriber is allowed access to the second access network, wherein the first PCRF represents to the second PCRF that the candidate subscriber is requesting access to the second access network, and wherein the query comprises a credit control request (CCR) message sent to the second PCRF via an S9 interface that connects the first PCRF and the second PCRF;

receive a credit control answer (CCA) message from the second PCRF via the S9 interface as confirmation that the candidate subscriber is allowed access to the second access network;

steer the candidate subscriber to the second access network; and offload the candidate subscriber from the first access network to the second access network;

wherein the first access network is of a different type than the second access network; and wherein the first access network comprises a long term evolution (LTE) network and the second access network comprises a Wi-Fi access network.

18. The system of claim 17 wherein the first PCRF is configured to offload the candidate subscriber by denying access to the first access network.

19. The system of claim 17 wherein the first PCRF is configured to send a short message service (SMS) message or a multimedia message service (MMS) message to the candidate subscriber prior to offloading the candidate subscriber.

20. The system of claim 17 wherein the first PCRF is configured to a generate policy and charging rule to limit the Quality of Service (QoS) or a bandwidth associated with a service provided by the first access network prior to terminating access to the first access network.

21. The system of claim 17 wherein the first PCRF presents itself to the second PCRF as a gateway of the second PCRF.

22. The system of claim 17 wherein representing to the second PCRF that the candidate subscriber is requesting access to the second access network comprises identifying the candidate subscriber using a subscriber identifier that is known to the second PCRF.

23. The system of claim 22 wherein identifying the candidate subscriber using a subscriber identifier that is known to the second PCRF comprises mapping a first subscriber identifier that is known to the first PCRF to a second subscriber identifier that is known to the second PCRF and identifying the subscriber to the second PCRF using the second subscriber identifier.

24. The system of claim 23 wherein mapping a first subscriber identifier that is known to the first PCRF to a second identifier that is known to the second PCRF comprises querying a database that maps the first subscriber identifier to the second subscriber identifier.

25. The system of claim 24 wherein querying a database that maps the first subscriber identifier to the second subscriber identifier comprises querying a subscriber profile repository (SPR) or home subscriber server (HSS).

26. The system of claim 17 wherein steering the candidate subscriber to the second access network comprises at least one of:

generating by the first PCRF a policy rule that results in a throttling of use of the first access network by the candidate subscriber;

notifying the candidate subscriber of an availability of the second access network; and sending a message to the candidate subscriber suggesting that the candidate subscriber use the second access network.

27. The system of claim 17 wherein identifying a subscriber of the first access network as a candidate subscriber for steering comprises identifying a subscriber that is accessing or attempting to access the first access network.

28. The system of claim 17 wherein identifying a subscriber of the first access network as a candidate subscriber for steering comprises identifying a subscriber that is using or attempting to use a network application or service.

29. The system of claim 28 wherein the network application or service comprises at least one of: a streaming video service; a web browsing service; a voice service; a messaging service; a music delivery service; a multimedia content delivery service; and an IMS service.

30. The system of claim 17 wherein identifying a subscriber of the first access network as a candidate subscriber for steering comprises identifying a subscriber based on the subscriber's profile, authorizations, permissions, current activity or historical activity.

31. The system of claim 17 wherein identifying a subscriber of the first access network as a candidate subscriber for steering comprises detecting a trigger for steering candidate subscribers to the second access network.

32. The system of claim 31 wherein detecting a trigger for steering candidate subscribers to the second access network comprises detecting a network condition, wherein the network condition comprises at least one of: actual network congestion, predicted network congestion, detected network impairment, and scheduled network maintenance.

33. A non-transitory computer readable medium having stored thereon executable instructions that when executed by the processor of a computer control the computer to perform steps comprising:

at a first policy and charging rules function (PCRF) that serves a first access network:

identifying a subscriber of the first access network as a candidate subscriber for steering to a second access network that is served by a second PCRF;

faking a user attachment to the second access network by querying the second PCRF to determine whether the candidate subscriber is allowed access to the second access network, wherein the first PCRF presents itself to the second PCRF that the candidate subscriber is requesting access to the second access network, and wherein querying the second PCRF comprises sending a credit control request (CCR) message to the second PCRF via an S9 interface that connects the first PCRF and the second PCRF;

receiving a credit control answer (CCA) message from the second PCRF via the S9 interface as confirmation that the candidate subscriber is allowed access to the second access network;

steering the candidate subscriber to the second access network; and offloading the candidate subscriber from the first access network to the second access network;

wherein the first access network is of a different type than the second access network; and wherein the first access network comprises a long term evolution (LTE) network and the second access network comprises a Wi-Fi access network.

* * * * *